(12) United States Patent
Walsh

(10) Patent No.: US 7,697,542 B1
(45) Date of Patent: Apr. 13, 2010

(54) PROGRAMMABLE RESOURCE SCHEDULER

(75) Inventor: Hugh Walsh, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 730 days.

(21) Appl. No.: 11/501,303

(22) Filed: Aug. 9, 2006

Related U.S. Application Data

(60) Provisional application No. 60/786,505, filed on Mar. 28, 2006.

(51) Int. Cl.
*H04L 12/56* (2006.01)
(52) U.S. Cl. .................................. 370/395.4
(58) Field of Classification Search ................ 370/389, 370/395.1, 395.4, 349, 395.41
See application file for complete search history.

(56) References Cited

U.S. PATENT DOCUMENTS

| | | | |
|---|---|---|---|
| 6,438,563 B1 * | 8/2002 | Kawagoe ..................... | 707/201 |
| 6,542,509 B1 * | 4/2003 | Giroux ........................ | 370/397 |
| 6,570,873 B1 * | 5/2003 | Isoyama et al. ............. | 370/375 |
| 6,677,946 B1 * | 1/2004 | Ohba .......................... | 345/426 |
| 6,704,321 B1 * | 3/2004 | Kamiya ....................... | 370/412 |
| 6,810,012 B1 * | 10/2004 | Yin et al. .................. | 370/230.1 |
| 2006/0285548 A1 * | 12/2006 | Hill et al. .................... | 370/416 |
| 2007/0050805 A1 * | 3/2007 | Rotenstein ................... | 725/19 |
| 2008/0056278 A1 * | 3/2008 | Kadambi et al. ....... | 370/395.53 |
| 2008/0107120 A1 * | 5/2008 | Willhite et al. ......... | 370/395.41 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology— Telecommunications and information exchange between systems—Local and metropolitan area networks— Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner*—Dang T Ton
*Assistant Examiner*—Kevin Lee

(57) ABSTRACT

In general, in one aspect, the invention features a data structure representing a schedule for a plurality of N resources, and apparatus, methods, and computer programs for generating and using the data structure, the data structure comprising: M records each representing a different one of M slots in the schedule, wherein M>1, wherein each of the M slots is allocated to one of the N resources, and wherein each of the M records comprises identifiers of the N ones of the M slots in the schedule allocated to a next occurrence of each of the N resources following the one of the M slots represented by the record, and an identifier of an order in which the N resources occur in the schedule following the one of the M slots represented by the record.

43 Claims, 9 Drawing Sheets

OTHER PUBLICATIONS

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor Jan. 2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band— Corrigendum 1; LAN/MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

802.11n; IEEE P802.11-04/0889r6; Wireless LANs, TGn Sync Proposal Technical Specification; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

* cited by examiner

200

204　　　　　202

| Slot | Resource |
|------|----------|
| 0 | 3 |
| 1 | 2 |
| 2 | 3 |
| 3 | 1 |
| 4 | 3 |
| 5 | 2 |
| 6 | 3 |
| 7 | 0 |
| 8 | 3 |
| 9 | 2 |
| 10 | 3 |
| 11 | 1 |
| 12 | 3 |
| 13 | 2 |
| 14 | 3 |

*FIG. 2*

| Slot | bin3 | bin2 | bin1 | bin0 | next_slot_3 | next_slot_2 | next_slot_1 | next_slot_0 |
|---|---|---|---|---|---|---|---|---|
| 0 | 0001 | 0010 | 1000 | 0100 | 2 | 1 | 3 | 7 |
| 1 | 0001 | 0100 | 0010 | 1000 | 2 | 5 | 3 | 7 |
| 2 | 0001 | 0100 | 1000 | 0010 | 4 | 5 | 3 | 7 |
| 3 | 0010 | 0001 | 0100 | 1000 | 4 | 5 | 11 | 7 |
| 4 | 0010 | 0001 | 1000 | 0100 | 6 | 5 | 11 | 7 |
| 5 | 0010 | 0100 | 0001 | 1000 | 6 | 9 | 11 | 7 |
| 6 | 0010 | 0100 | 1000 | 0001 | 8 | 9 | 11 | 7 |
| 7 | 0001 | 0010 | 0100 | 1000 | 8 | 9 | 11 | 7 |
| 8 | 0001 | 0010 | 1000 | 0100 | 10 | 9 | 11 | 7 |
| 9 | 0001 | 0100 | 0010 | 1000 | 10 | 13 | 11 | 7 |
| 10 | 0001 | 0100 | 1000 | 0010 | 12 | 13 | 3 | 7 |
| 11 | 0001 | 0100 | 0100 | 1000 | 12 | 13 | 3 | 7 |
| 12 | 0001 | 0010 | 0100 | 1000 | 14 | 1 | 3 | 7 |
| 13 | 0001 | 0010 | 0100 | 1000 | 14 | 1 | 3 | 7 |
| 14 | 0001 | 0010 | 0100 | 1000 | 0 | 1 | 3 | 7 |

FIG. 3

PROGRAMMABLE RESOURCE SCHEDULER

CROSS-REFERENCE TO RELATED APPLICATIONS

This application claims the benefit of U.S. Provisional Patent Application Ser. No. 60/786,505 filed Mar. 28, 2006, the disclosure thereof incorporated by reference herein in its entirety.

BACKGROUND

The present invention relates generally to resource scheduling. More particularly, the present invention relates to programmable resource schedulers.

SUMMARY

In general, in one aspect, the invention features a memory to store a scheduling data structure for a schedule for N resources, wherein N>1, the scheduling data structure comprising M records, wherein M>1, wherein each of the M records represents a different one of M slots in the schedule, and wherein each of the M slots is allocated to one of N resources; and a scheduler comprising a read circuit to read the record indicated by an index, a select circuit to select the resource allocated to the slot represented by the record read by the read circuit, and an index circuit to generate the index based on a previous record read by the read circuit, comprising an availability circuit to determine which of the resources are available, a next available resource circuit to select the available resource that occurs next in the schedule based on the previous record, and a resource order circuit to identify the record representing the next slot allocated to the selected available resource based on the previous record, and to generate the index to indicate the identified record.

In some embodiments, each of the N resources occurs in the schedule $W_N$ times; and $$M = \sum_{i=0}^{N-1} W_i.$$

In some embodiments, each of the M records comprises: identifiers of the N ones of the M slots in the schedule allocated to a next occurrence of each of the N resources following the one of the M slots represented by the record; and an identifier of an order in which the N resources occur in the schedule following the one of the M slots represented by the record. In some embodiments, the identifier of the order in which the N resources occur in the schedule comprises, for each of the M records: a sequence of N fields each comprising an identifier of a respective one of the N resources. In some embodiments, the identifiers of the N resources are coded as one-hot binary numbers. Some embodiments comprise the N resources. In some embodiments, each of the resources comprises: a buffer for packets of data; wherein the apparatus transmits one or more of the packets of data when the corresponding resource is selected. Some embodiments comprise a network device comprising the apparatus, wherein the network device is selected from the group consisting of: a switch; a router; and a network interface controller. Some embodiments comprise a wireless network device according to claim 8 which is compliant with at least one standard selected from the group consisting of IEEE standards 802.11, 802.11a, 802.11b, 802.11g, 802.11n, 802.16, and 802.20.

In general, in one aspect, the invention features an apparatus comprising: means for storing a scheduling data structure for a schedule for N resources, wherein N>1, the scheduling data structure comprising M records, wherein M>1, wherein each of the M records represents a different one of M slots in the schedule, and wherein each of the M slots is allocated to one of N resources; and means for scheduling comprising means for reading the record indicated by an index, means for selecting the resource allocated to the slot represented by the record read by the means for reading, and means for generating the index based on a previous record read by the means for reading, comprising means for determining which of the resources are available, means for selecting the available resource that occurs next in the schedule based on the previous record, means for identifying the record representing the next slot allocated to the selected available resource based on the previous record, and means for generating the index to indicate the identified record.

In some embodiments, each of the N resources occurs in the schedule $W_N$ times; and $$M = \sum_{i=0}^{N-1} W_i.$$

In some embodiments, each of the M records comprises: identifiers of the N ones of the M slots in the schedule allocated to a next occurrence of each of the N resources following the one of the M slots represented by the record; and an identifier of an order in which the N resources occur in the schedule following the one of the M slots represented by the record. In some embodiments, the identifier of the order in which the N resources occur in the schedule comprises, for each of the M records: a sequence of N fields each comprising an identifier of a respective one of the N resources. In some embodiments, the identifiers of the N resources are coded as one-hot binary numbers. Some embodiments comprise the N resources. In some embodiments, each of the resources comprises: a buffer for packets of data; wherein the apparatus transmits one or more of the packets of data when the corresponding resource is selected. Some embodiments comprise a network device comprising the apparatus, wherein the network device is selected from the group consisting of: a switch; a router; and a network interface controller. Some embodiments comprise a wireless network device according to claim 17 which is compliant with at least one standard selected from the group consisting of IEEE standards 802.11, 802.11a, 802.11b, 802.11g, 802.11n, 802.16, and 802.20.

In general, in one aspect, the invention features a method comprising: (a) selecting one of M records in a scheduling data structure comprising M of the records, wherein M>1, wherein each of the M records represents a different one of M slots in a schedule, wherein each of the M slots is allocated to one of N resources, wherein N>1; (b) selecting the resource allocated to the slots represented by the selected record; and (c) selecting a subsequent record, comprising determining which of the resources are available, selecting the available resource that occurs next in the schedule based on the record selected in step (a), and identifying the record representing the next slot allocated to the selected available resource based on the record selected in step (a). Some embodiments comprise repeating steps (b) and (c). In some embodiments, each of the N resources occurs in the schedule $W_N$ times; and $$M = \sum_{i=0}^{N-1} W_i.$$

In some embodiments, each of the resources represents packets of data, further comprising: transmitting one or more of the packets of data represented by the selected resource. In some embodiments, each of the M records comprises: identifiers of the N ones of the M slots in the schedule allocated to a next occurrence of each of the N resources following the one of the M slots represented by the record; and an identifier of an order in which the N resources occur in the schedule following the one of the M slots represented by the record. In some embodiments, the identifier of the order in which the N resources occur in the schedule comprises, for each of the M records: a sequence of N fields each comprising an identifier of a respective one of the N resources. In some embodiments, the identifiers of the N resources are coded as one-hot binary numbers.

In general, in one aspect, the invention features a computer program comprising: (a) selecting one of M records in a scheduling data structure comprising M of the records, wherein M>1, wherein each of the M records represents a different one of M slots in a schedule, wherein each of the M slots is allocated to one of N resources, wherein N>1; (b) selecting the resource allocated to the slots represented by the selected record; and (c) selecting a subsequent record, comprising determining which of the resources are available, selecting the available resource that occurs next in the schedule based on the record selected in step (a), and identifying the record representing the next slot allocated to the selected available resource based on the record selected in step (a).

Some embodiments comprise repeating steps (b) and (c). In some embodiments, each of the N resources occurs in the schedule $W_N$ times; and $$M = \sum_{i=0}^{N-1} W_i.$$

In some embodiments, each of the resources represents packets of data, further comprising: causing transmission of one or more of the packets of data represented by the selected resource. In some embodiments, each of the M records comprises: identifiers of the N ones of the M slots in the schedule allocated to a next occurrence of each of the N resources following the one of the M slots represented by the record; and an identifier of an order in which the N resources occur in the schedule following the one of the M slots represented by the record. In some embodiments, the identifier of the order in which the N resources occur in the schedule comprises, for each of the M records: a sequence of N fields each comprising an identifier of a respective one of the N resources. In some embodiments, the identifiers of the N resources are coded as one-hot binary numbers.

In general, in one aspect, the invention features a method comprising: identifying a schedule for N resources, wherein N>1; generating a data structure representing the schedule for the N resources, comprising generating M records each representing a different one of M slots in the schedule, wherein M>1, wherein each of the M slots is allocated to one of the N resources, comprising, for each of the M records generating identifiers of the N ones of the M slots in the schedule allocated to a next occurrence of each of the N resources following the one of the M slots represented by the record, and generating an identifier of an order in which the N resources occur in the schedule following the one of the M slots represented by the record.

In some embodiments, each of the N resources occurs in the schedule $W_N$ times; and $$M = \sum_{i=0}^{N-1} W_i.$$

In some embodiments, generating the identifier of the order in which the N resources occur in the schedule comprises, for each of the M records: generating a sequence of N fields each comprising an identifier of a respective one of the N resources. Some embodiments comprise encoding the identifiers of the N resources as one-hot binary numbers. Some embodiments comprise receiving the schedule, wherein the schedule comprises M entries, each representing one of the M slots and the one of the N resources scheduled for the one of the M slots. Some embodiments comprise identifying the N resources; and generating the schedule, comprising generating M entries, each representing one of the M slots and the one of the N resources scheduled for the one of the M slots. Some embodiments comprise identifying a weight WN for each of the N resources; and generating the schedule based on the weights WN.

In general, in one aspect, the invention features a computer program comprising: identifying a schedule for N resources, wherein N>1; generating a data structure representing the schedule for the N resources, comprising generating M records each representing a different one of M slots in the schedule, wherein M>1, wherein each of the M slots is allocated to one of the N resources, comprising, for each of the M records generating identifiers of the N ones of the M slots in the schedule allocated to a next occurrence of each of the N resources following the one of the M slots represented by the record, and generating an identifier of an order in which the N resources occur in the schedule following the one of the M slots represented by the record.

In some embodiments, each of the N resources occurs in the schedule $W_N$ times; and $$M = \sum_{i=0}^{N-1} W_i.$$

In some embodiments, generating the identifier of the order in which the N resources occur in the schedule comprises, for each of the M records: generating a sequence of N fields each comprising an identifier of a respective one of the N resources. Some embodiments comprise encoding the identifiers of the N resources as one-hot binary numbers. Some embodiments comprise receiving the schedule, wherein the schedule comprises M entries, each representing one of the M slots and the one of the N resources scheduled for the one of the M slots. Some embodiments comprise identifying the N resources; and generating the schedule, comprising generating M entries, each representing one of the M slots and the one of the N resources scheduled for the one of the M slots. Some embodiments comprise identifying a weight WN for each of the N resources; and generating the schedule based on the weights WN.

In general, in one aspect, the invention features a data structure representing a schedule for N resources, wherein N>1, the data structure comprising: M records each representing a different one of M slots in the schedule, wherein M>1, wherein each of the M slots is allocated to one of the N resources, and wherein each of the M records comprises identifiers of the N ones of the M slots in the schedule allocated to a next occurrence of each of the N resources following the one of the M slots represented by the record, and an identifier of an order in which the N resources occur in the schedule following the one of the M slots represented by the record.

In some embodiments, each of the N resources occurs in the schedule $W_N$ times; and $$M = \sum_{i=0}^{N-1} W_i.$$

In some embodiments, the identifier of the order in which the N resources occur in the schedule comprises, for each of the M records: a sequence of N fields each comprising an identifier of a respective one of the N resources. In some embodiments, the identifiers of the N resources are coded as one-hot binary numbers.

The details of one or more implementations are set forth in the accompanying drawings and the description below. Other features will be apparent from the description and drawings, and from the claims.

DESCRIPTION OF DRAWINGS

FIG. 2 shows an exemplary schedule for N resources comprising M slots where N=4 and M=15.

FIG. 3 shows a data structure representing the schedule of FIG. 2 according to a preferred embodiment of the present invention.

Figure 1:
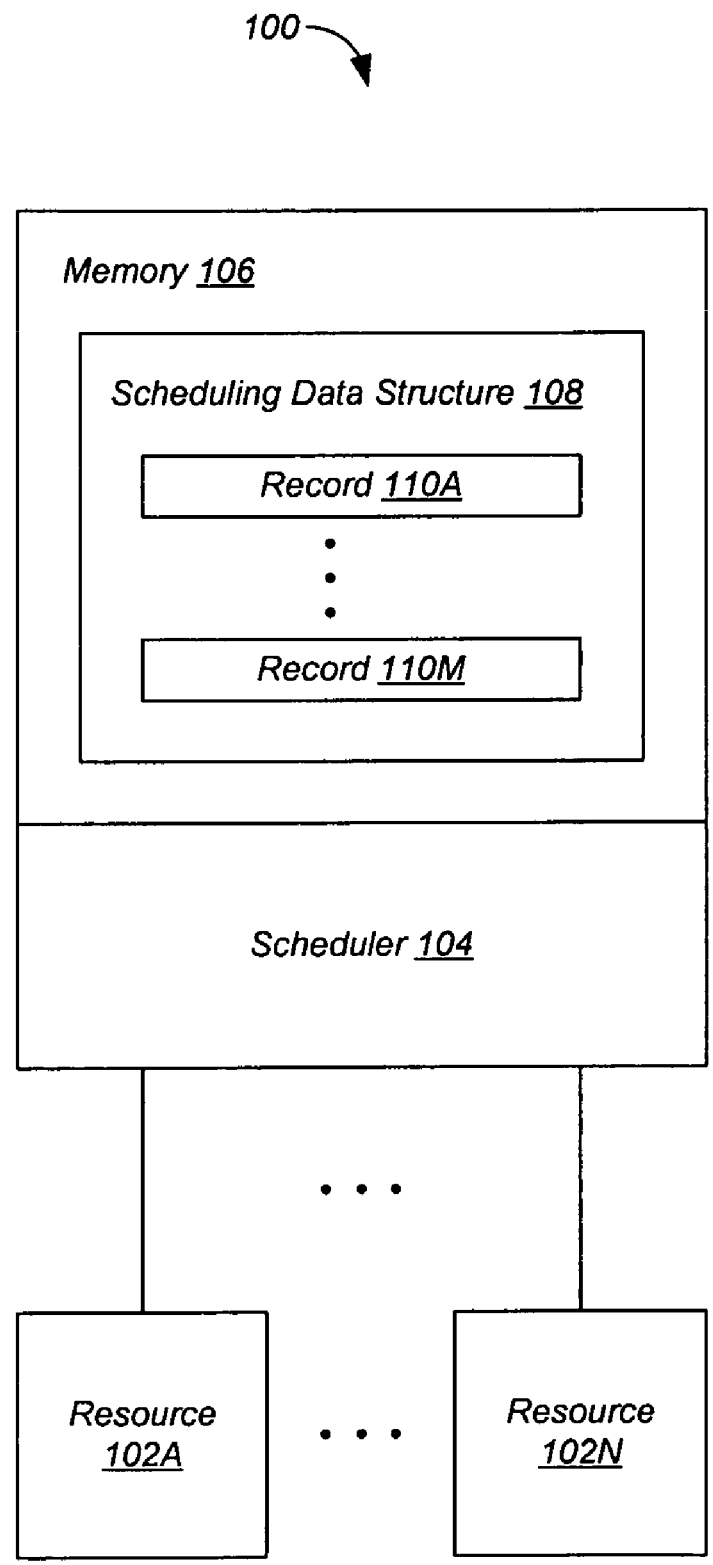
FIG. 1 shows a programmable resource scheduling system for N resources, each of which may be available or unavailable, and a schedule having M slots, according to a preferred embodiment of the present invention.

The leading digit(s) of each reference numeral used in this specification indicates the number of the drawing in which the reference numeral first appears.

DETAILED DESCRIPTION

Embodiments of the present invention provide a data structure representing a schedule for N resources, wherein N>1. The data structure comprises M records each representing a different one of M slots in the schedule, wherein M>1, wherein each of the M slots is allocated to one of the N resources, and wherein each of the M records comprises identifiers of the N ones of the M slots in the schedule allocated to a next occurrence of each of the N resources following the one of the M slots represented by the record, and an identifier of an order in which the N resources occur in the schedule following the one of the M slots represented by the record.

Some embodiments of the present invention provide an apparatus to use the data structure to select the resources according to the schedule. For example, according to a preferred embodiment of the present invention, a network switch implementing multiple quality-of-service (QoS) levels employs the data structure to schedule the transmission of packets of data from the switch.

Some embodiments of the present invention provide an apparatus to generate the data structure based upon the schedule. For example, a customer can provide a schedule comprising a sequence in which the resources are to be selected. The data structure is then generated based upon the schedule supplied by the customer.

Some embodiments of the present invention generate the schedule. For example, a customer can supply the number of resources and the weighting of each. The schedule is then generated based upon the information supplied by the customer.

FIG. 1 shows a programmable resource scheduling system 100 for N resources, each of which may be available or unavailable, and a schedule having M slots, according to a preferred embodiment of the present invention. Programmable resource scheduling system 100 comprises resources 102A-N, a scheduler 104, and a memory 106 comprising a scheduling data structure 108. According to a preferred embodiment of the present invention, scheduling data structure 108 comprises a plurality of records 110A-M, one for each slot in the schedule, as described in detail below. Each record 110 comprises, for each of the N resources 102, an identifier of the next slot in the schedule allocated to the resource 102, and an identifier of the order in which the resources 102 occur in the schedule following the current slot.

A user can program scheduler 104 by providing a schedule having a plurality of slots each associated with one of resources 102. Embodiments of the present invention then create scheduling data structure 108 according to the schedule provided by the user. Alternatively, the user can program scheduler 104 by providing scheduling information consisting of the number of slots, the number of resources 102, and a weight for each resource 102. Embodiments of the present invention then create scheduling data structure 108 according to the scheduling information provided by the user.

Scheduler 104 reads a record 110, and then selects the resource 102 indicated by the record 110. Scheduler 104 then selects another record 110 based on the current record 110 and which resources 102 are available, and then selects the resource 102 indicated by the selected record 110. This process can repeat as desired. Because only one record 110 is required to determine the next schedule slot, only one read operation is required, rather than the multiple read operations required by conventional schedulers. Therefore scheduler 104 is much faster than conventional schedulers.

Now a data structure representing a schedule, and a method for generating the data structure, are described according to a preferred embodiment of the present invention. FIG. 2 shows an exemplary schedule 200 for N resources 202 comprising M slots 204 where N=4 and M=15. FIG. 3 shows a data structure 300 representing schedule 200 of FIG. 2 according to a preferred embodiment of the present invention.

Figure 4:
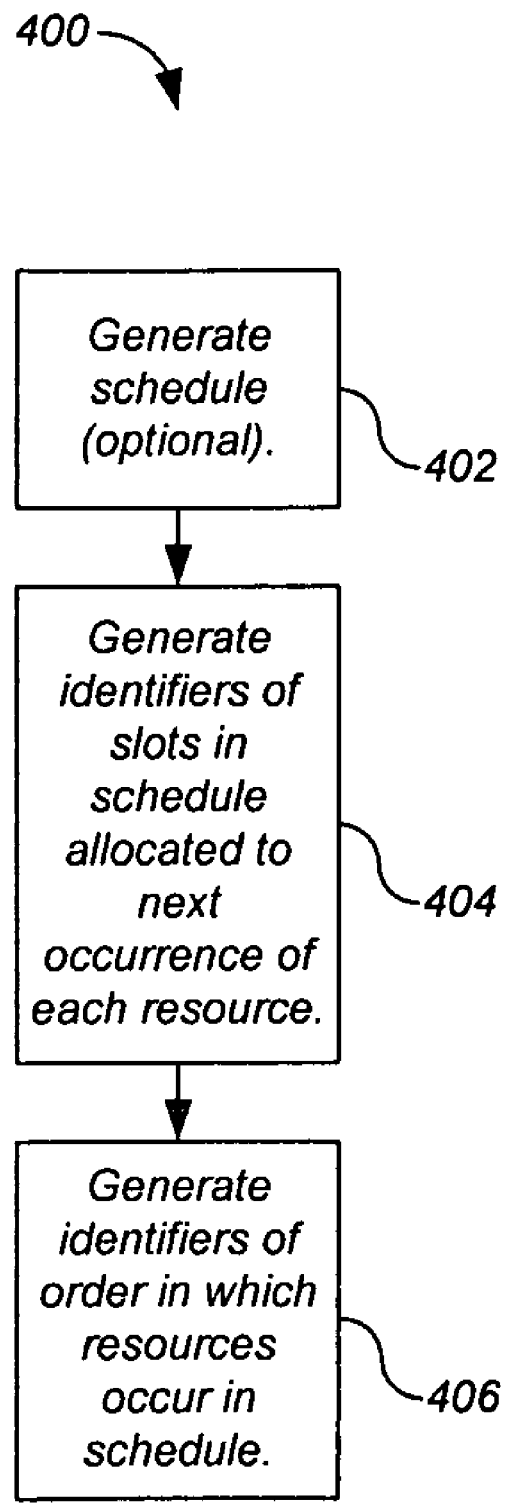
FIG. 4 shows a process for generating the data structure of FIG. 3 according to a preferred embodiment of the present invention.

FIG. 4 shows a process 400 for generating data structure 300 of FIG. 3 according to a preferred embodiment of the present invention. Process 400 optionally generates schedule 200 based on information supplied by a customer (step 402). For example, the customer can supply the number of resources and the weight of each. Referring to the example of FIG. 2, the customer information indicates four resources (N=4) numbered 3, 2, 1, 0 and corresponding weights $W_3=8$, $W_2=4$, $W_1=2$, $W_0=1$. This information requires a schedule of M slots where $$M = \sum_{i=0}^{N-1} W_i. \qquad (1)$$

in which each resource N will appear $W_N$ times. Process 400 can generate schedule 200 according to any process. Embodiments of the present invention are not limited by the process by which schedule 200 is generated.

Referring again to FIG. 3, data structure 300 comprises M records 302A-M each representing a different one of the M slots 204 in schedule 200. Each record 302 comprises identifiers 304 of the N ones of the slots 204 in schedule 200 allocated to a next occurrence of a respective one of the N resources following the slot 204 represented by the record 302. In FIG. 3, the identifiers for resources N=3, 2, 1, 0 are labeled next_slot_3, next_slot_2, next_slot_1, and next_slot_0, respectively.

Each record 302 also comprises an identifier 306 of the order in which the N resources 202 occur in schedule 200 following the slot 204 represented by the record 302. In some embodiments, each identifier 306 comprises a sequence of N fields (referred to herein as a "bins") each comprising an identifier of one of the N resources. In FIG. 3, the bins are labeled, in order of occurrence of the identified resource 202 in schedule 200, bin0, bin1, bin2, and bin3.

Process 400 generates the M records 302. Referring again to FIG. 3, for each record 302, process 400 generates identifiers 304 (step 404). For example, referring to FIG. 2, consider slot 0 of schedule 200, which is allocated to resource 3. The next occurrences of resources 3, 2, 1, 0 following slot 0 are found in slots 2, 1, 3, 7, respectively. Process 400 therefore populates identifiers 304 of record 302A (which represents slot 0) of data structure 300 with those values (that is, next_slot_$_{3}$=2, next_slot_$_{2}$=1, next_slot_$_{1}$=3, next_slot_$_{0}$=7).

Referring again to FIG. 3, for each record 302, process 400 also generates identifier 306 (step 406). For example, referring to FIG. 2, again consider slot 0 of schedule 200, which is allocated to resource 3. Following slot 0 in schedule 200, resources 3, 2, 1, 0 occur in the order 2, 3, 1, 0. In some embodiments, process 400 codes identifiers 306 as one-hot binary numbers, that is, binary number where only one bit is set. The code used in data structure 300 of FIG. 3 is shown in Table 1.

TABLE 1

| Resource Number | One-Hot Coded Binary Number |
|---|---|
| 3 | 1000 |
| 2 | 0100 |
| 1 | 0010 |
| 0 | 0001 |

Process 400 therefore populates identifiers 306 of record 302A (which represents slot 0) of data structure 300 with the one-hot binary numbers for 2, 3, 1, 0 in sequence (that is, bin0=0100, bin1=1000, bin2=0010, bin3=0001). Recall that bin0 identifies the closest resource in schedule 200, while bin3 identifies the resource that is most distant in schedule 200, from the current slot.

Figure 5:
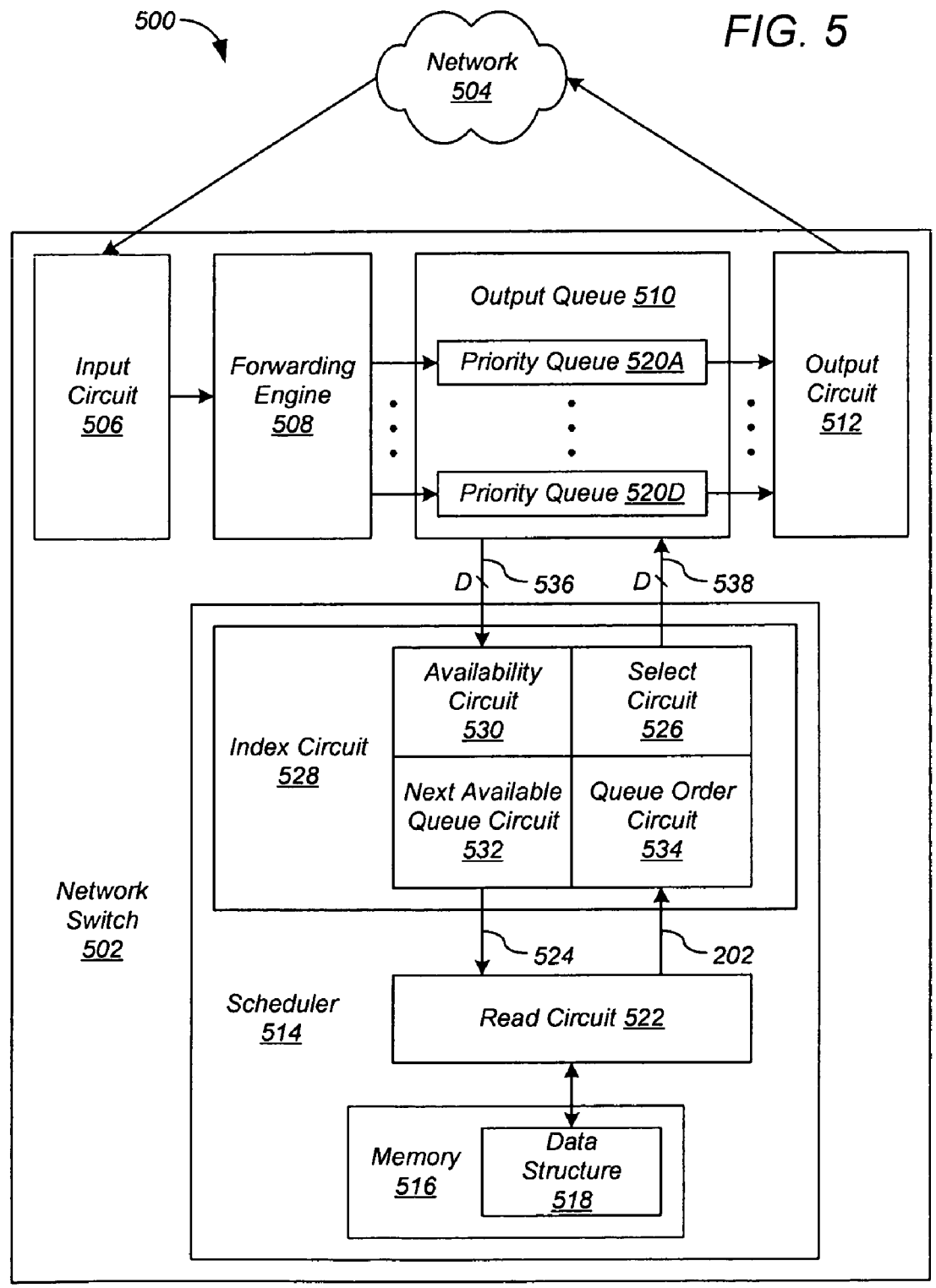
FIG. 5 shows a data communications system comprising a network switch in communication with a network according to a preferred embodiment of the present invention.

Embodiments of the present invention comprise apparatus, methods and software for using the data structures of the present invention to select resources. In some embodiments, the resources comprise buffers in a network switch implementing a plurality of QoS levels. FIG. 5 shows a data communications system 500 comprising a network switch 502 in communication with a network 504 according to a preferred embodiment of the present invention. While embodiments of the present invention are described in the context of an output-queued switch, other embodiments can be used in other types of switches, as will be apparent to one skilled in the relevant arts after reading this description. And while embodiments of the present invention are described with reference to a network switch, other embodiments can be implemented as routers, network interface controllers, and the like. Embodiments of the present invention that are implemented wirelessly are preferably compliant with at least one of IEEE standards 802.11, 802.11a, 802.11b, 802.11g, 802.11n, 802.16, and 802.20. Furthermore, embodiments of the present invention are not limited to data communications, and can be used to schedule any sort of resources.

Network switch 502 comprises one or more input circuits 506 to receive packets of data from network 504, a forwarding engine 508 to forward the packets of data to one or more output queues 510, which deliver the packets to one or more respective output circuits 512 under the control of a respective scheduler 514. Each output queue 510 comprises 4 priority queues 520A-D. Output circuit(s) 512 transmit the packets to network 504. In some embodiments, each of the priority queues 520 stores packets of data having a respective QoS level. For purposes of explanation, assume that priority queues 520A-D store packets having priorities 0-3, respectively.

Scheduler 514 operates according to a data structure 518 stored in a memory 516. In some embodiments, data structure 518 has the structure described above with reference to data structure 300 of FIG. 3, and represents a schedule such as schedule 200 of FIG. 2. For purposes of explanation, network switch 502 is described with reference to schedule 200 and data structure 300, where each resource represents one of the D priority queues 520A-D. Of course, network switch 502 can employ a data structure representing different numbers of resources 202 and slots 204 than represented by data structure 300, as will be apparent to one skilled in the relevant arts after reading this description.

When network switch 502 comprises multiple output queues 510, an independent scheduler 514 is implemented for each output queue 510. Schedulers 514 can share data structure 518, can employ separate copies of data structure 518, or can employ different data structures 518, that is, data structures 518 having the same structure but different contents and/or dimensions.

Scheduler 514 comprises a read circuit 522 to read the record 302 indicated by an index 524, a select circuit 526 to select the priority queue 520 allocated to the slot 204 represented by the record 302 read by read circuit 522, and an index circuit 528 to generate index 524 based on a previous record 302 read by read circuit 522. Index circuit 528 comprises an availability circuit 530 to determine which of priority queues 520 are available, that is, which of priority queues 520 contain packets to be transmitted. Index circuit 528 further comprises a next available queue circuit 532 to select the priority queue 520 that occurs next in schedule 200 based on the previous record 302, and a queue order circuit 534 to identify the record 302 representing the next slot 204 allocated to the selected priority queue 520 based on the previous record 302.

Figure 6:
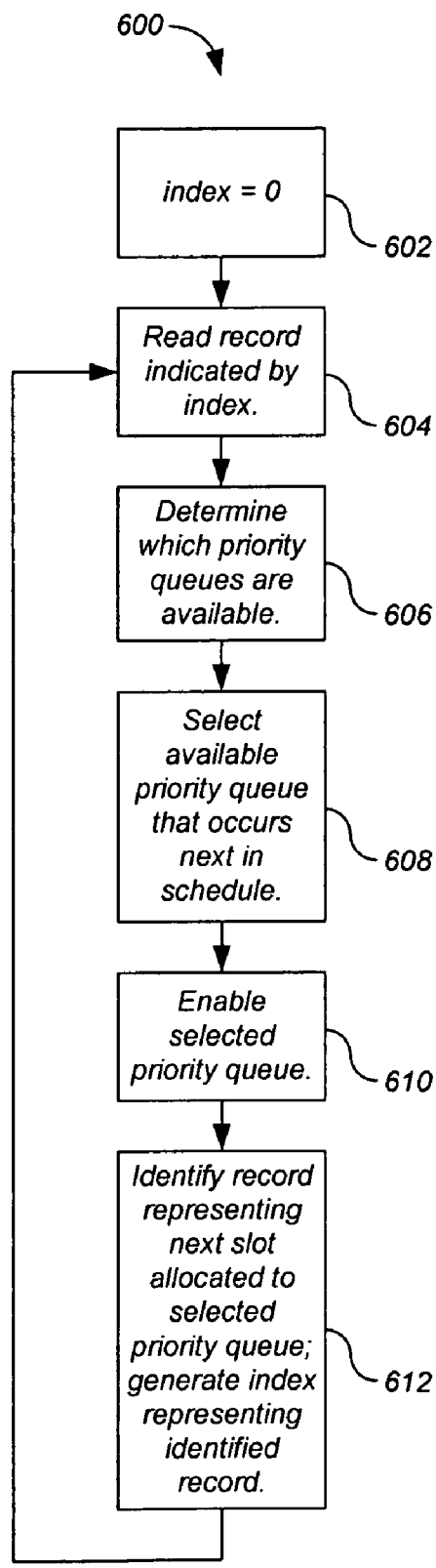
FIG. 6 shows a process for the scheduler of FIG. 5 according to a preferred embodiment of the present invention.

FIG. 6 shows a process 600 for scheduler 514 of FIG. 5 according to a preferred embodiment of the present invention. When network switch 502 comprises multiple output queues 510, an independent process 600 is implemented for each output queue 510. While embodiments of the present invention are described in the context of an output-queued switch, other embodiments can be used in other types of switches, as will be apparent to one skilled in the relevant arts after reading this description. And while embodiments of the present invention are described with reference to a network switch, other embodiments can be implemented as routers, network interface controllers, and the like. Furthermore, embodiments of the present invention are not limited to data communications, and can be used to schedule any sort of resources.

Process 600 begins by resetting index 424 to zero (step 602). Read circuit 522 then reads the record indicated by index 324 (step 604). In the current example, the index=0, so read circuit 522 reads record 302A, which represents slot 0.

Process 600 determines whether any of priority queues 520 have packets to be transmitted, and if so, selects one of those priority queues 520 according to schedule 200 based only on the record 302 of data structure 518 that was read in step 604.

Because only one record 302 is required per schedule slot, only one read operation is required, rather than the multiple read operations required by conventional schedulers. Therefore scheduler 514 is much faster than conventional schedulers, allowing network switch 502 to operate at much higher speeds.

Index circuit 528 generates index 524 based on the record 302 read by read circuit 522, and based on the availability of priority queues 520. In particular, availability circuit 530 determines which priority queues 520 are available in output queue 510 (step 606), that is, which of priority queues 520 have packets to be transmitted. In some embodiments, each priority queue 520 asserts a respective availability signal 536 when that priority queue 520 has packets to be transmitted, and availability circuit 530 determines which priority queues 520 are available based on availability signals 536. In other embodiments, availability circuit 530 polls priority queues 520 to determine availability.

Next available queue circuit 532 selects the available priority queue 520 that occurs next in schedule 200 based only on the previous record 302 (step 608). For example, referring to data structure 300 of FIG. 3, the current slot 204 is slot 0, which is represented by record 302A in data structure 300. Further assume that only priority queues 520B and 520D are available, representing packets having priorities 1 and 3, respectively. Referring to identifier 306 for record 302A in data structure 300, the priorities occur in schedule 200 in the order 2, 3, 1, 0 following slot 0 (as described above, these values are coded as one-hot binary numbers in schedule 200). Because priority 3 occurs before priority 1, available queue circuit 532 selects priority queue 520D, which corresponds to priority 3.

Select circuit 526 enables the priority queue 520 (520D in the example) selected by available queue circuit 532 (step 610). In some embodiments, select circuit 526 asserts a select signal 538 for the selected priority queue 520. In response, the selected priority queue 520 passes one or more packets of data to output circuit 512, which transmits the packet(s).

Queue order circuit 534 identifies the record 302 representing the next slot 204 allocated to the selected priority queue 520 (520D in the example) based only on the previous record 302, and generates index 524 representing the identified record 302 (step 612). For example, continuing the example of data structure 300 of FIG. 3, assume that the current slot 204 is slot 0, which is represented by record 302A in data structure 300. Referring to identifier 304 in record 302A in data structure 300, the next occurrence of priority 3 is in slot 2 (that is, next_slot$_{-3}$=2 for record 302A). Queue order circuit 534 therefore generates a value for index 524 of index=2.

Read circuit 522 reads the record indicated by index 524 (resuming at step 604). In the current example, the index=2, so read circuit 522 reads record 302C, which represents slot 2. Process 600 can repeat to process schedule 200 as many times as desired.

Figure 7B:
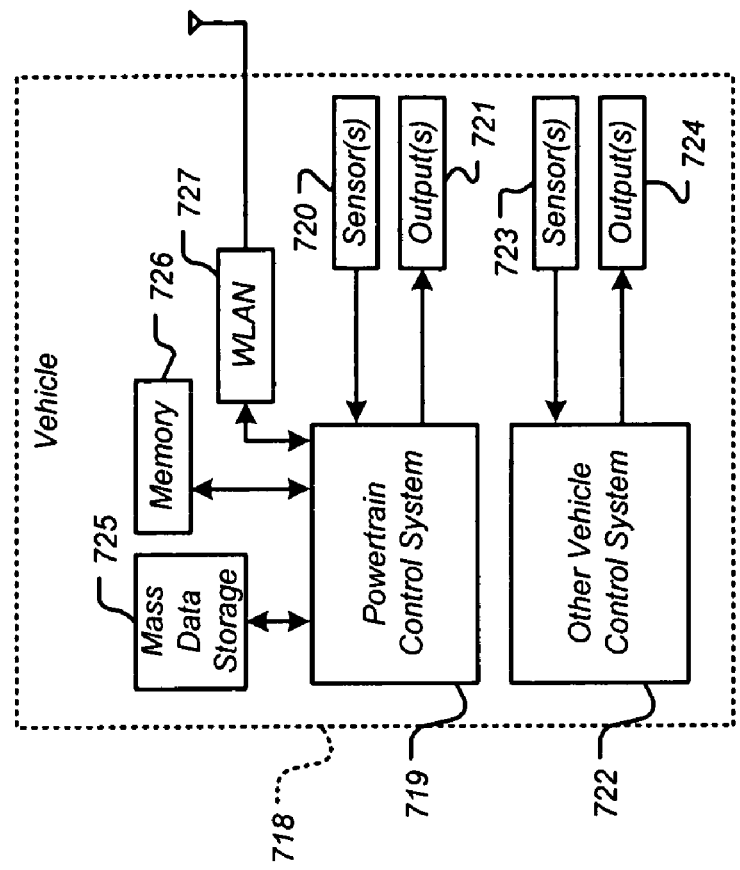
FIGS. 7A-7E show various exemplary implementations of the present invention.
Figure 7A:
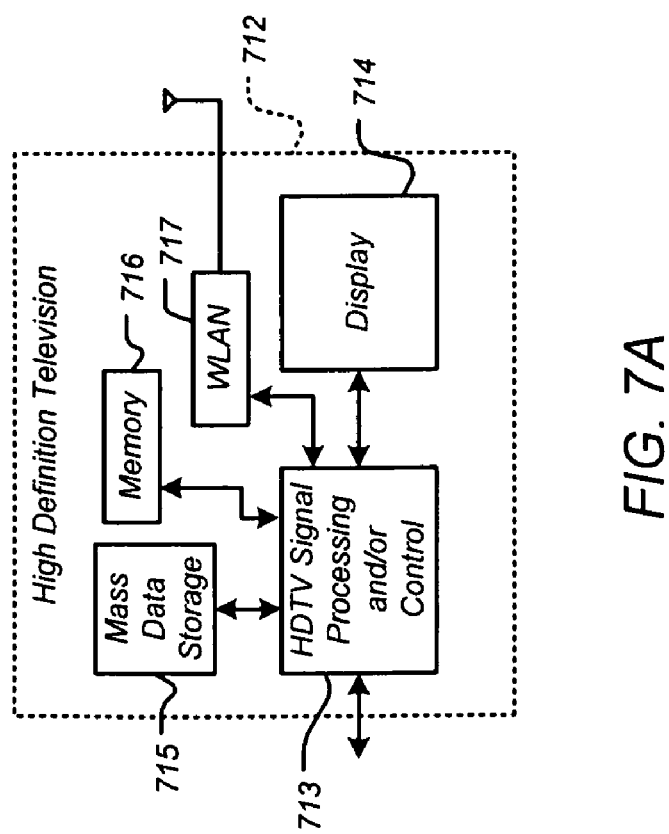

FIGS. 7A-7E show various exemplary implementations of the present invention. Referring now to FIG. 7A, the present invention can be implemented in a high definition television (HDTV) 712. The present invention may implement either or both signal processing and/or control circuits, which are generally identified in FIG. 7A at 713, a WLAN interface and/or mass data storage of the HDTV 712. The HDTV 712 receives HDTV input signals in either a wired or wireless format and generates HDTV output signals for a display 714. In some implementations, signal processing circuit and/or control circuit 713 and/or other circuits (not shown) of the HDTV 712 may process data, perform coding and/or encryption, perform calculations, format data and/or perform any other type of HDTV processing that may be required.

The HDTV 712 may communicate with mass data storage 715 that stores data in a nonvolatile manner such as optical and/or magnetic storage devices. The HDD may be a mini HDD that includes one or more platters having a diameter that is smaller than approximately 1.8". The HDTV 712 may be connected to memory 716 such as RAM, ROM, low latency nonvolatile memory such as flash memory and/or other suitable electronic data storage. The HDTV 712 also may support connections with a WLAN via a WLAN network interface 717.

Referring now to FIG. 7B, the present invention implements a control system of a vehicle 718, a WLAN interface and/or mass data storage of the vehicle control system. In some implementations, the present invention implements a powertrain control system 719 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 722 of the vehicle 718. The control system 722 may likewise receive signals from input sensors 723 and/or output control signals to one or more output devices 724. In some implementations, the control system 722 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 719 may communicate with mass data storage 725 that stores data in a nonvolatile manner. The mass data storage 725 may include optical and/or magnetic storage devices for example hard disk drives HDD and/or DVDs. The HDD may be a mini HDD that includes one or more platters having a diameter that is smaller than approximately 1.8"The powertrain control system 719 may be connected to memory 726 such as RAM, ROM, low latency nonvolatile memory such as flash memory and/or other suitable electronic data storage. The powertrain control system 719 also may support connections with a WLAN via a WLAN network interface 727. The control system 722 may also include mass data storage, memory and/or a WLAN interface (all not shown).

Figure 7C:
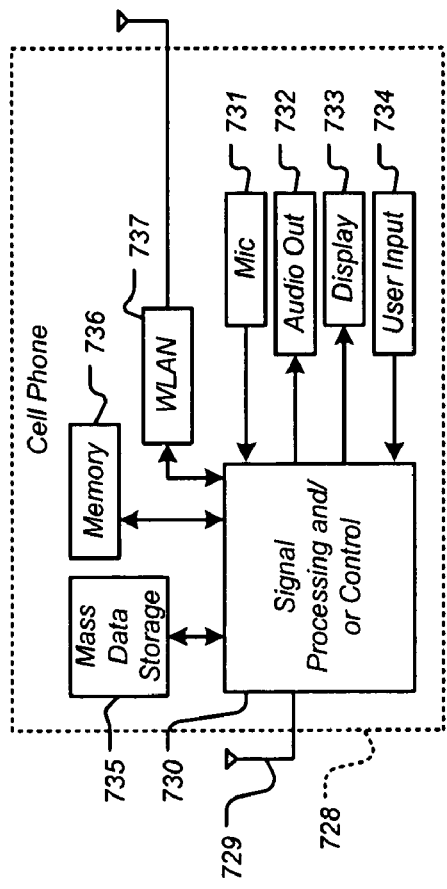

Referring now to FIG. 7C, the present invention can be implemented in a cellular phone 728 that may include a cellular antenna 729. The present invention may implement either or both signal processing and/or control circuits, which are generally identified in FIG. 7C at 730, a WLAN interface and/or mass data storage of the cellular phone 728. In some implementations, the cellular phone 728 includes a microphone 731, an audio output 732 such as a speaker and/or audio output jack, a display 733 and/or an input device 734 such as a keypad, pointing device, voice actuation and/or other input device. The signal processing and/or control circuits 730 and/or other circuits (not shown) in the cellular phone 728 may process data, perform coding and/or encryption, perform calculations, format data and/or perform other cellular phone functions.

The cellular phone 728 may communicate with mass data storage 735 that stores data in a nonvolatile manner such as optical and/or magnetic storage devices for example hard disk drives HDD and/or DVDs. The HDD may be a mini HDD that includes one or more platters having a diameter that is smaller than approximately 1.8"The cellular phone 728 may be connected to memory 736 such as RAM, ROM, low latency nonvolatile memory such as flash memory and/or other suitable electronic data storage. The cellular phone 728 also may support connections with a WLAN via a WLAN network interface 737.

Figure 7D:
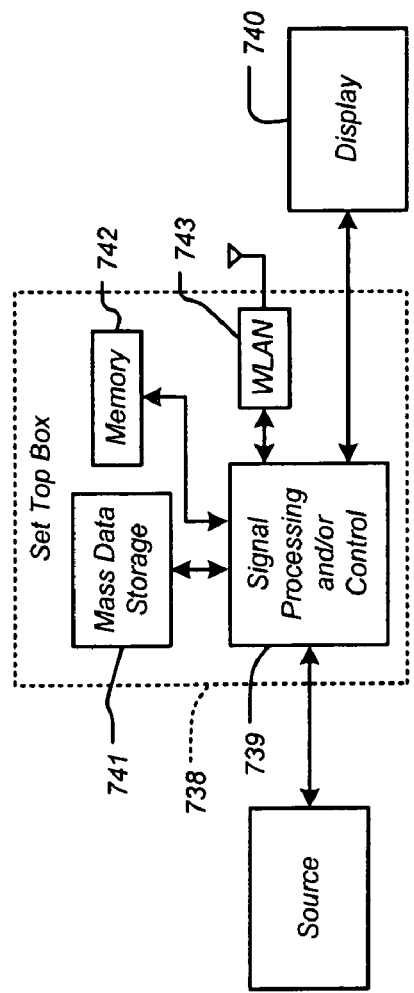

Referring now to FIG. 7D, the present invention can be implemented in a set top box 738. The present invention may implement either or both signal processing and/or control circuits, which are generally identified in FIG. 7D at 739, a WLAN interface and/or mass data storage of the set top box 738. The set top box 738 receives signals from a source such as a broadband source and outputs standard and/or high definition audio/video signals suitable for a display 740 such as a television and/or monitor and/or other video and/or audio output devices. The signal processing and/or control circuits 739 and/or other circuits (not shown) of the set top box 738 may process data, perform coding and/or encryption, perform calculations, format data and/or perform any other set top box function.

The set top box 738 may communicate with mass data storage 743 that stores data in a nonvolatile manner. The mass data storage 743 may include optical and/or magnetic storage devices for example hard disk drives HDD and/or DVDs. The HDD may be a mini HDD that includes one or more platters having a diameter that is smaller than approximately 1.8"The set top box 738 may be connected to memory 742 such as RAM, ROM, low latency nonvolatile memory such as flash memory and/or other suitable electronic data storage. The set top box 738 also may support connections with a WLAN via a WLAN network interface 743.

Figure 7E:
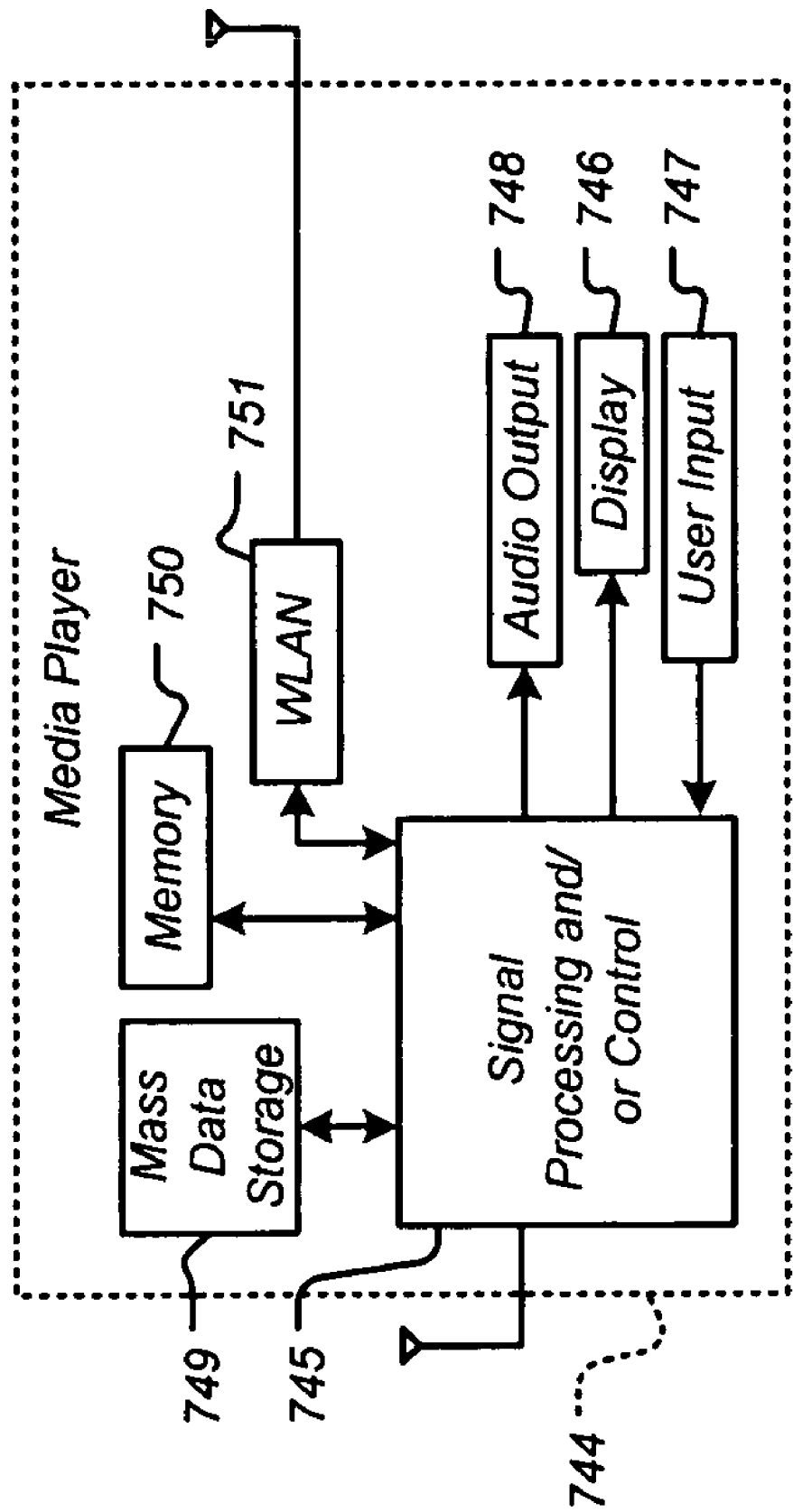

Referring now to FIG. 7E, the present invention can be implemented in a media player 744. The present invention may implement either or both signal processing and/or control circuits, which are generally identified in FIG. 7E at 745, a WLAN interface and/or mass data storage of the media player 744. In some implementations, the media player 744 includes a display 746 and/or a user input 747 such as a keypad, touchpad and the like. In some implementations, the media player 744 may employ a graphical user interface (GUI) that typically employs menus, drop down menus, icons and/or a point-and-click interface via the display 746 and/or user input 747. The media player 744 further includes an audio output 748 such as a speaker and/or audio output jack. The signal processing and/or control circuits 745 and/or other circuits (not shown) of the media player 744 may process data, perform coding and/or encryption, perform calculations, format data and/or perform any other media player function.

The media player 744 may communicate with mass data storage 749 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8"The media player 744 may be connected to memory 750 such as RAM, ROM, low latency nonvolatile memory such as flash memory and/or other suitable electronic data storage. The media player 744 also may support connections with a WLAN via a WLAN network interface 751. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a non-transitory tangible computer readable storage medium for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a memory to store a scheduling data structure for a schedule for N resources,
wherein:
N>1;
the scheduling data structure comprises M records;
M>1;
each of the M records represents a different one of M slots in the schedule; and
each of the M slots is allocated to one of the N resources; and
a scheduler comprising:
a read circuit to read a record indicated by an index;
a select circuit to select the resource allocated to the slot represented by the record read by the read circuit; and
an index circuit to generate the index based on a previous record read by the read circuit,
wherein:
the index circuit comprises:
an availability circuit to determine which of the N resources are available;
a next available resource circuit to select the available resource that occurs next in the schedule based on the previous record; and
a resource order circuit to identify the record representing the next slot allocated to the selected available resource based on the previous record, and to generate the index to indicate the identified record;

each of the N resources occurs in the schedule WN times; and $$M = \sum_{i=0}^{N-1} W_i.$$

2. The apparatus of claim 1, wherein each of the M records comprises:
   identifiers of the N ones of the M slots in the schedule allocated to a next occurrence of each of the N resources following the one of the M slots represented by the record; and
   an identifier of an order in which the N resources occur in the schedule following the one of the M slots represented by the record.
3. The apparatus of claim 2, wherein:
   the identifier of the order in which the N resources occur in the schedule comprises a sequence of N fields for each of the M records; and
   each of the N fields comprises an identifier of a respective one of the N resources.
4. The apparatus of claim 3, wherein the identifiers of the N resources are coded as one-hot binary numbers.
5. The apparatus of claim 1, further comprising the N resources.
6. The apparatus of claim 5, wherein:
   each of the resources comprises a buffer for packets of data; and
   the apparatus transmits one or more of the packets of data when the corresponding resource is selected.
7. The apparatus of claim 6, wherein the apparatus is a network device, and the network device is selected from a group consisting of:
   a switch;
   a router; and
   a network interface controller.
8. The apparatus of claim 6, wherein the apparatus is a wireless network device, and the wireless network device is compliant with at least one standard selected from a group consisting of IEEE standards 802.11, 802.11a, 802.11b, 802.11g, 802.11n, 802.16, and 802.20.
9. An apparatus comprising:
   means for storing a scheduling data structure for a schedule for N resources,
   wherein:
     N>1;
     the scheduling data structure comprises M records;
     M>1;
     each of the M records represents a different one of M slots in the schedule; and
     each of the M slots is allocated to one of the N resources; and
   means for scheduling comprising:
     means for reading a record indicated by an index;
     means for selecting the resource allocated to the slot represented by the record read by the means for reading; and
     means for generating the index based on a previous record read by the means for reading,
   wherein:
     the means for generating comprises:
       means for determining which of the N resources are available;
       means for selecting the available resource that occurs next in the schedule based on the previous record;
       means for identifying the record representing the next slot allocated to the selected available resource based on the previous record; and
       means for generating the index to indicate the identified record;
     each of the N resources occurs in the schedule $W_N$ times; and $$M = \sum_{i=0}^{N-1} W_i.$$

10. The apparatus of claim 9, wherein each of the M records comprises:
    identifiers of the N ones of the M slots in the schedule allocated to a next occurrence of each of the N resources following the one of the M slots represented by the record; and
    an identifier of an order in which the N resources occur in the schedule following the one of the M slots represented by the record.
11. The apparatus of claim 10, wherein:
    the identifier of the order in which the N resources occur in the schedule comprises a sequence of N fields for each of the M records; and
    each of the N fields comprises an identifier of a respective one of the N resources.
12. The apparatus of claim 11, wherein the identifiers of the N resources are coded as one-hot binary numbers.
13. The apparatus of claim 9, further comprising the N resources.
14. The apparatus of claim 13, wherein:
    each of the resources comprises a buffer for packets of data; and
    the apparatus transmits one or more of the packets of data when the corresponding resource is selected.
15. The apparatus of claim 14, wherein the apparatus is a network device, and the network device is selected from a group consisting of:
    a switch;
    a router; and
    a network interface controller.
16. The apparatus of claim 14, wherein the apparatus is a wireless network device, and
    the wireless network device is compliant with at least one standard selected from a group consisting of IEEE standards 802.11, 802.11a, 802.11b, 802.11g, 802.11n, 802.16, and 802.20.
17. A method performed by a scheduler comprising:
    (a) selecting one of M records in a scheduling data structure comprising M of the records,
    wherein:
      M>1;
      each of the M records represents a different one of M slots in a schedule;
      each of the M slots is allocated to one of N resources; and
      N>1;
    (b) selecting the resource allocated to the slots represented by the selected record; and
    (c) selecting a subsequent record comprising:
      determining which of the N resources are available;
      selecting the available resource that occurs next in the schedule based on the record selected in step (a); and identifying the record representing the next slot allocated to the selected available resource based on the record selected in step (a),
wherein:
each of the N resources occurs in the schedule $W_N$ times; and $$M = \sum_{i=0}^{N-1} W_i.$$

18. The method of claim 17, further comprising repeating steps (b) and (c).

19. The method of claim 17, wherein:
each of the resources represents packets of data; and
the method further comprises transmitting one or more of the packets of data represented by the selected resource.

20. The method of claim 17, wherein each of the M records comprises:
identifiers of the N ones of the M slots in the schedule allocated to a next occurrence of each of the N resources following the one of the M slots represented by the record; and
an identifier of an order in which the N resources occur in the schedule following the one of the M slots represented by the record.

21. The method of claim 20, wherein:
the identifier of the order in which the N resources occur in the schedule comprises a sequence of N fields for each of the M records; and
each of the N fields comprises an identifier of a respective one of the N resources.

22. The method of claim 21, wherein the identifiers of the N resources are coded as one-hot binary numbers.

23. A non-transitory tangible computer readable storage medium encoded with a computer program and executable by a computer, the computer program comprising instructions for:
(a) selecting one of M records in a scheduling data structure comprising M of the records,
wherein:
M>1;
each of the M records represents a different one of M slots in a schedule;
each of the M slots is allocated to one of N resources; and
N>1;
(b) selecting the resource allocated to the slots represented by the selected record; and
(c) selecting a subsequent record comprising:
determining which of the resources are available;
selecting the available resource that occurs next in the schedule based on the record selected in step (a); and
identifying the record representing the next slot allocated to the selected available resource based on the record selected in step (a),
wherein:
each of the N resources occurs in the schedule $W_N$ times; and $$M = \sum_{i=0}^{N-1} W_i.$$

24. The computer readable storage medium of claim 23, wherein the computer program, further comprises instructions for repeating steps (b) and (c).

25. The computer readable storage medium of claim 23, wherein:
each of the resources represents packets of data; and
the computer program_further comprises instructions for causing transmission of one or more of the packets of data represented by the selected resource.

26. The computer readable storage medium of claim 23, wherein each of the M records comprises:
identifiers of the N ones of the M slots in the schedule allocated to a next occurrence of each of the N resources following the one of the M slots represented by the record; and
an identifier of an order in which the N resources occur in the schedule following the one of the M slots represented by the record.

27. The computer readable storage medium of claim 26, wherein:
the identifier of the order in which the N resources occur in the schedule comprises a sequence of N fields for each of the M records; and
each of the N fields comprises an identifier of a respective one of the N resources.

28. The computer readable storage medium of claim 27, wherein the identifiers of the N resources are coded as one-hot binary numbers.

29. A method performed by a scheduler comprising:
identifying a schedule for N resources, where N>1;
generating a data structure representing the schedule for the N resources;
generating M records each representing a different one of M slots in the schedule, where M>1,
wherein each of the M slots is allocated to one of the N resources;
generating for each of the M records identifiers of the N ones of the M slots in the schedule allocated to a next occurrence of each of the N resources following the one of the M slots represented by the record; and
generating for each of the M records an identifier of an order in which the N resources occur in the schedule following the one of the M slots represented by the record,
wherein:
each of the N resources occurs in the schedule $W_N$ times; and $$M = \sum_{i=0}^{N-1} W_i.$$

30. The method of claim 29, wherein:
generating the identifier of the order in which the N resources occur in the schedule comprises generating a sequence of N fields for each of the M records; and
each of the N fields comprises an identifier of a respective one of the N resources.

31. The method of claim 30, further comprising:
encoding the identifiers of the N resources as one-hot binary numbers.

32. The method of claim 29, further comprising receiving the schedule,
wherein:
the schedule comprises M entries; and
each of the M entries represents one of the M slots and the one of the N resources scheduled for the one of the M slots.

33. The method of claim 29, further comprising:
identifying the N resources; and
generating the schedule comprising generating M entries, wherein each of the M entries represents one of the M slots and the one of the N resources scheduled for the one of the M slots.

34. The method of claim 33, further comprising:
identifying a weight $W_N$ for each of the N resources; and generating the schedule based on the weights $W_N$.

35. A non-transitory tangible computer readable storage medium encoded with a computer program and executable by a computer, the computer program comprising instructions for:
identifying a schedule for N resources, where N>1; and
generating a data structure representing the schedule for the N resources;
generating M records each representing a different one of M slots in the schedule, where M>1,
wherein each of the M slots is allocated to one of the N resources;
generating for each of the M records identifiers of the N ones of the M slots in the schedule allocated to a next occurrence of each of the N resources following the one of the M slots represented by the record; and
generating for each of the M records an identifier of an order in which the N resources occur in the schedule following the one of the M slots represented by the record
wherein:
each of the N resources occurs in the schedule $W_N$ times; and $$M = \sum_{i=0}^{N-1} W_i.$$

36. The computer readable storage medium of claim 35, wherein:
generating the identifier of the order in which the N resources occur in the schedule comprises generating a sequence of N fields for each of the M records; and each of the N fields comprises an identifier of a respective one of the N resources.

37. The computer readable storage medium of claim 36, wherein the computer program, further comprises instructions for encoding the identifiers of the N resources as one-hot binary numbers.

38. The computer readable storage medium of claim 35, wherein the computer program, further comprises instructions for receiving the schedule,
wherein:
the schedule comprises M entries and
each of the M entries represents one of the M slots and the one of the N resources scheduled for the one of the M slots.

39. The computer readable storage medium of claim 35, wherein the computer program, further comprises instructions for:
identifying the N resources; and
generating the schedule comprising generating M entries, wherein each of the M entries represents one of the M slots and the one of the N resources scheduled for the one of the M slots.

40. The computer readable storage medium of claim 39, wherein the computer program further comprises instructions for:
identifying a weight $W_N$ for each of the N resources; and generating the schedule based on the weights $W_N$.

41. The apparatus of claim 1, wherein the index circuit generates the index based on the previous record read by the read circuit before reading the record indicated by the index.

42. The apparatus of claim 1 wherein:
the index circuit generates the index based only on the previous record; and
the read circuit conducts only a single read operation for each one of the M slots.

43. The apparatus of claim 1, wherein the record indicated by the index is not constructed from the previous record.

* * * * *